United States Patent
Bird et al.

(10) Patent No.: US 11,662,984 B2
(45) Date of Patent: *May 30, 2023

(54) FREQUENT SOURCE CODE PATTERN MINING

(71) Applicant: MICROSOFT TECHNOLOGY LICENSING, LLC., Redmond, WA (US)

(72) Inventors: Christian Alma Bird, Redmond, WA (US); Shengyu Fu, Redmond, WA (US); Neelakantan Sundaresan, Bellevue, WA (US); Nina Wang, Redmond, WA (US); Shuo Zhang, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,031

(22) Filed: Jun. 28, 2022

(65) Prior Publication Data
US 2022/0326918 A1    Oct. 13, 2022

Related U.S. Application Data

(63) Continuation of application No. 16/835,306, filed on Mar. 31, 2020, now Pat. No. 11,392,354.

(51) Int. Cl.
G06F 8/36        (2018.01)
G06F 16/22       (2019.01)
G06F 16/2458     (2019.01)
G06F 8/30        (2018.01)

(52) U.S. Cl.
CPC .............. *G06F 8/36* (2013.01); *G06F 8/315* (2013.01); *G06F 16/2246* (2019.01); *G06F 16/2465* (2019.01); *G06F 2216/03* (2013.01)

(58) Field of Classification Search
None
See application file for complete search history.

(56) References Cited

U.S. PATENT DOCUMENTS

| | | | |
|---|---|---|---|
| 9,229,691 B2 * | 1/2016 | Huang | G06F 8/33 |
| 10,042,740 B2 * | 8/2018 | Bird | G06F 11/3672 |
| 10,606,570 B2 * | 3/2020 | Yoshida | G06F 8/75 |
| 11,055,351 B1 * | 7/2021 | Shyu | G06F 16/2379 |

(Continued)

OTHER PUBLICATIONS

Allamanis et al., "Mining Idioms from Source Code," ACM, 2014, 12pg. (Year: 2014).*

(Continued)

*Primary Examiner* — Ryan D. Coyer

(57) ABSTRACT

A data mining technique is used to find large frequently-occurring source code patterns from methods/APIs that can be used in code development. Simplified trees that represent the syntactic structure and type and method usage of a source code fragment, such as a method, are mined to find closed and maximal frequent subtrees which represent the largest frequently-occurring source code patterns or idioms associated with a particular type and method usage. These idioms are then used in an idiom web service and/or a code completion system to assist users in the development of source code programs.

20 Claims, 15 Drawing Sheets

(56) References Cited

U.S. PATENT DOCUMENTS

| | | | | |
|---|---|---|---|---|
| 2010/0042976 A1* | 2/2010 | Hines | ................ | G06F 8/72 |
| | | | | 717/127 |
| 2012/0174061 A1* | 7/2012 | McCollum | ................ | G06F 8/33 |
| | | | | 717/106 |
| 2014/0165039 A1* | 6/2014 | Asadullah | ................ | G06F 8/36 |
| | | | | 717/123 |
| 2014/0173559 A1* | 6/2014 | Tiwari | ................ | G06F 8/71 |
| | | | | 717/122 |
| 2015/0331681 A1* | 11/2015 | Rose | ................ | G06F 8/437 |
| | | | | 717/143 |
| 2020/0097261 A1* | 3/2020 | Smith | ................ | G06N 3/084 |

OTHER PUBLICATIONS

Chi et al., "Mining Closed and Maximal Frequent Subtrees from Databases of Labeled Rooted Trees," IEEE, 2005, 13pg. (Year: 2005).*

Pham et al., "Mining Patterns in Source Code Using Tree Mining Algorithms," Springer, 22nd International Conference on Discovery Science, 2019, 11pg. (Year: 2019).*

* cited by examiner

FREQUENT SOURCE CODE PATTERN MINING

CROSS-REFERENCE TO RELATED APPLICATION

This application is a continuation of U.S. Pat. No. 11,392,354, filed on Mar. 31, 2020, which is incorporated by reference herein in its entirety.

BACKGROUND

Source code patterns are code fragments that occur frequently within various source code programs. These source code patterns are often used to develop new software. This practice saves time and resources by reusing parts of programs instead of expending the cost of creating, testing, and deploying new source code. The source code patterns may be found in various sources, such as libraries (e.g., third party libraries, built-in language libraries), code samples, templates, and open source repositories.

There are many software development tools available to assist a software developer to develop source code. Often these tools do not provide enough support to find existing code fragments that can be used to create code for an intended purpose.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Source code programs are mined to discover previously unknown patterns that may be used in the development of source code. The source code patterns or idioms are detected from the application of a data mining technique applied to methods of various source code programs. The large corpus of methods from these source code programs are converted into simplified trees that represent the syntactic structure and semantic data of a method. The data mining technique detects closed and maximal frequent subtrees from the simplified trees which represent the largest frequently-occurring patterns. These patterns are matched with methods that have a similar syntactic structure and which use similar types and method calls.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects of the present invention pertain to data mining source code programs for frequently-used source code patterns or idioms from a large corpus of existing source code. Data mining is the process of discovering previously unknown patterns in large datasets. In one aspect, a data mining technique is applied to detect patterns in source code methods that may be used in other methods having a similar syntactic structure, and similar type and method usage. Simplified trees that represent the syntactic structure and type and method usage of a source code fragment, such as a method, are mined to find closed and maximal frequent subtrees. These subtrees represent the largest frequently-occurring patterns that are associated with a particular type and method usage. These patterns are then used in an idiom web service and/or a code completion system to assist users (e.g., developers, customers, clients, etc.) in the development of source code programs.

Attention now turns to a further discussion of the system, devices, components, and methods utilized in mining for source code patterns.

System

Figure 1:
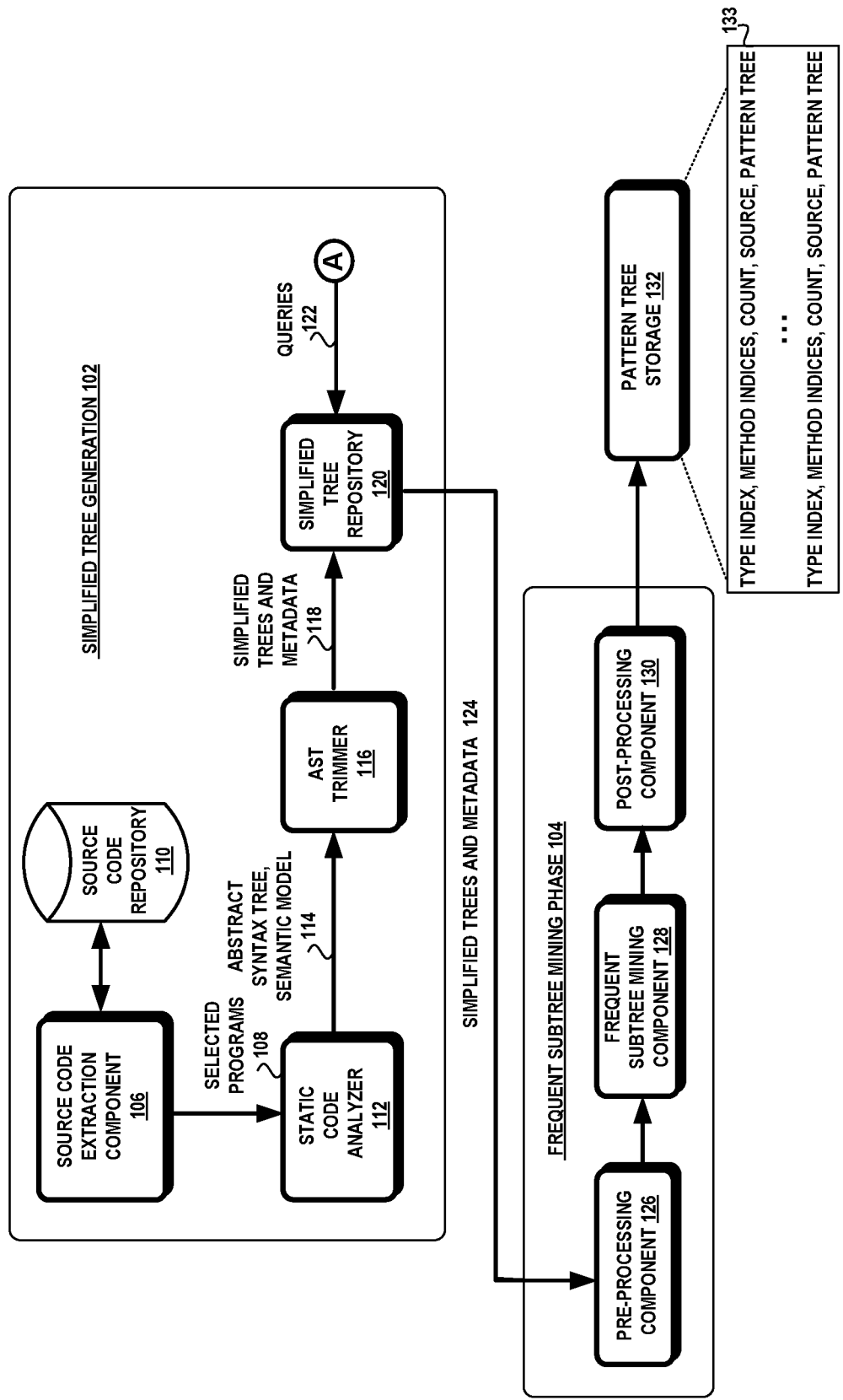
FIG. 1 illustrates an exemplary system for frequent source code pattern mining.

FIG. 1 illustrates a block diagram of an exemplary system 100 in which various aspects of the invention may be practiced. In one aspect, system 100 includes a simplified tree generation phase 102 and a frequent subtree mining phase 104. The simplified tree generation phase 102 generates simplified trees representing the syntax structure and semantic properties of various methods taken from a large corpus of source code programs. The frequent subtree mining phase 104 mines the simplified trees to detect closed and maximal frequent subtrees representing large patterns that occur frequently. These patterns are represented in pattern trees.

In the simplified tree generation phase 102, a source code extraction component 106 extracts source code programs 108 from a source code repository 110. A static code analyzer 112 (e.g., parser, front-end compiler, language compiler) parses the selected source code programs 108 to generate a corresponding syntax tree and a semantic model 114.

The source code repository 110 may be a file archive and web hosting facility that stores large amounts of source code either privately or publicly. The source code repository 110 can be structured as a version control system, such as GIT, Mercurial, etc. The source code programs residing in the source code repository 110 vary and may be written in different programming languages.

The source code extraction component 106 obtains several selected source code programs 108 which may be written in the same or different programming languages. A programming language utilizes a context-free grammar that is a set of rules that describe all possible strings in a formal programming language. The selected source code programs 108 can come from different domains, such as without limitation, scientific computing, web development, dataflow programming, machine learning, and the like.

In one aspect, the static code analyzer 112 generates an abstract syntax tree (AST) 114 for each method in each selected source code program. An AST is a tree that represents the abstract syntactic structure of a language construct in the grammar of the programming language of the program, where each interior node and the root node represent an operator and the children of the root and interior nodes represent the operands of that operator. The syntax tree is augmented with the semantic properties of each code construct.

The static code analyzer 112 generates a semantic model for the AST 114. The semantic model includes all the semantic information about the program. The semantic model includes information on the symbols referenced at a specific location in the program. Every namespace, type, method, property, field, event, parameter, label, and local variable may be represented by a symbol. Symbols may also include additional information that a static code analyzer determines from the program, such as methods and properties associated with the symbol. The semantic model encapsulates all this data into the AST.

The abstract syntax tree is then trimmed by an AST trimmer 116 into a simplified tree which is a more abstract representation of the AST. An AST is a sparse and compact representation of a parse tree. Data mining an AST is more difficult due to the sparsity of the data in the AST. For this reason, the AST trimmer 116 trims the AST into a more abstract tree, referred to as simplified tree 118, by supplementing the AST with the semantic data from the semantic model. The AST trimmer 116 generates metadata containing the location of the source code program (e.g., URL, etc.) represented by AST. The simplified trees 118 and their associated metadata are stored in a simplified tree repository 120.

The simplified tree repository 120 may retrieve an input query 122 to generate frequently-requested pattern trees that match the specifications of the input query 122. These pattern trees are generated to those applications and services that utilize pattern trees from a particular domain. Simplified trees that correspond to an input query are found and processed in the frequent subtree mining phase 104.

The frequent mining phase 104 includes a pre-processing component 126, a frequent subtree mining component 128, and a post-processing component 130. The pre-processing component 126 filters out data in the simplified tree, further trims the tree, and/or group the trees into clusters. Simplified trees corresponding to small methods, methods that are too large to process, or methods that appear to be automatically-generated may be eliminated by the pre-processing component 126.

The frequent subtree mining component 128 searches for closed and maximal frequent subtrees across a set of simplified trees, T. A maximal frequent subtree is a frequent subtree that is not part of any other frequent subtree. Given a set of simplified trees, referred to as the training data set of trees, the support of a simplified tree, T, is defined as a fraction of the trees in Tin which T occurs. A simplified tree, T, is frequent if its support is at least a user-specified threshold. A frequent subtree t is maximal if none of its supertrees are frequent. Support refers to the frequency of a subtree amongst all the trees in the set of simplified trees. A frequent subtree is closed when none of its supertrees has the same support.

The frequent subtree mining component 128 generates a number of closed and maximal frequent subtrees. The post-processing component 130 filters out duplicate subtrees, or merges similar trees, and stores the resulting subtrees as the pattern trees which are stored in a pattern tree storage 132. In addition, the post-processing component 130 deletes subtrees that do not have nodes representing types or method invocations. The frequent subtree mining phase 104 generates subtrees having nodes that include methods/APIs and types that can be matched to simplified trees containing nodes with similar methods/APIs and types. Types and method/API invocations are the most frequently-used code constructs of a program and are a more robust source of idioms.

For each pattern tree in the pattern tree storage 132, an entry includes a pattern tree, a type index, one or more method name indices, a count, and a source 133. The count represents the number of times the pattern is found amongst all the simplified trees in the simplified tree repository 120, the type index represents the type associated with the pattern tree, the method indices represent the method names associated with the pattern tree, and the source indicates the location of the source code program from which the pattern tree was generated. The source may include a Uniform Resource Locator (URL), repository name, project name, file name, etc.

Figure 2:
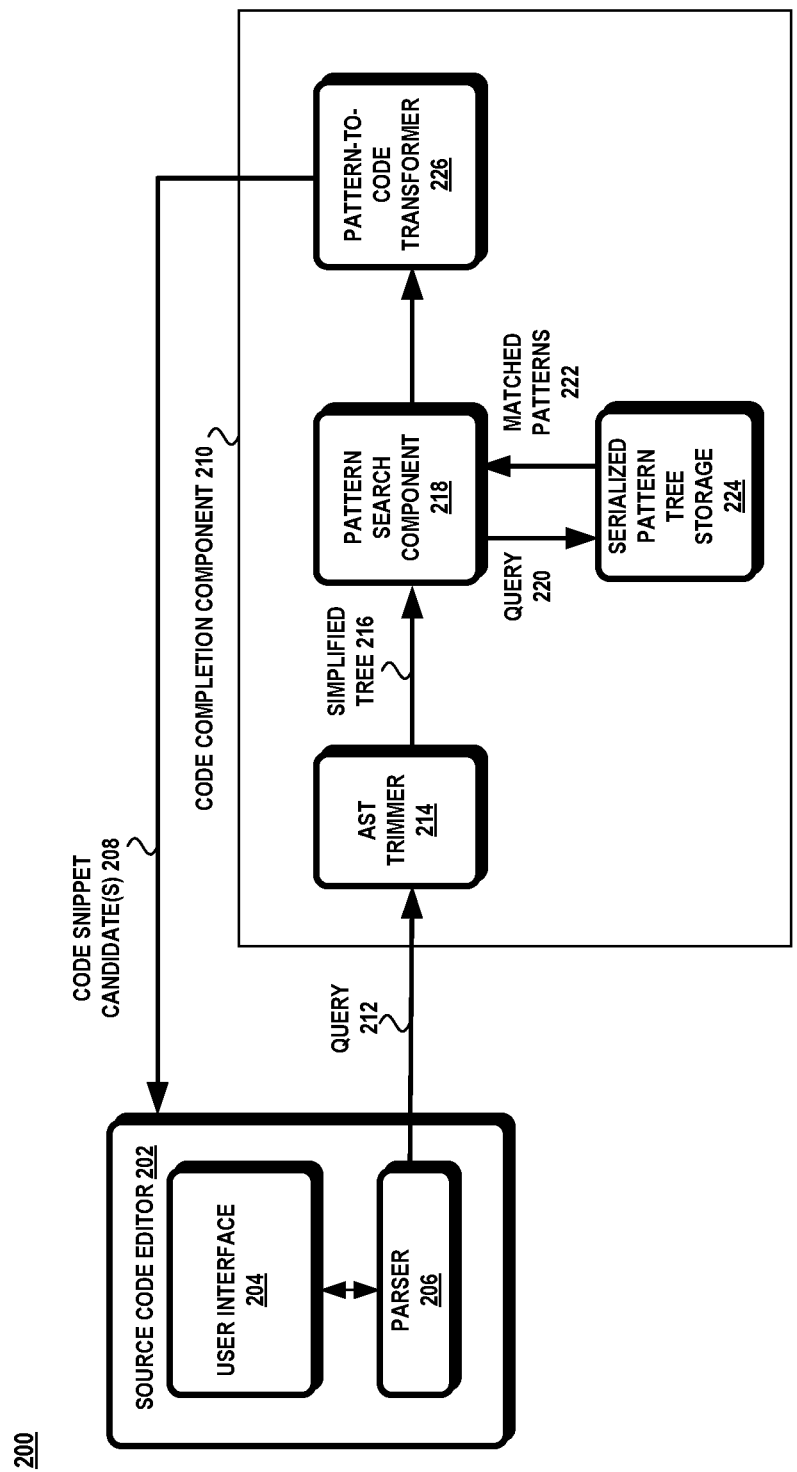
FIG. 2 is an exemplary code completion system using pattern trees to generate completion candidates.

FIG. 2 illustrates an exemplary code completion system 200 that utilizes the pattern trees. In one or more aspects, code completion may be a function or feature integrated into a software development environment or tool, such as a source code editor and/or integrated development environment (IDE). Code completion may be embodied as a tool or feature that can be an add-on, plug-in, extension and/or component of a source code editor, IDE, or combination thereof.

In one aspect, a source code editor 202 may include a user interface 204 and a parser 206. The user interface 204 includes a set of features or functions for writing and editing a source code program. The user interface 204 may utilize a pop-up window to present a list of code snippets to finish a program construct. A developer may browse through the code snippet candidates and select one from the list. In this manner, the code completion system 200 serves as documentation in addition to being an assistance to writing code quickly.

In one aspect, the parser 206 reads the source code entered into the source code editor 202 for a method and generates a corresponding abstract syntax tree for the source code of the method. The parser 206 continuously updates the abstract syntax tree as the developer creates and edits the source code of the method in the source code editor 202.

At certain points in the editing process, the user interface 204 will detect that the user has entered a particular character which will initiate code completion. In one aspect, the character that initiates code completion, or marker character, may be an end-of-line character. The end-of-line character indicates that the current line of code is finished and that the cursor is positioned at a new line in the source code editor.

The user interface 204 will then request code snippet candidates from the code completion component 210 to present to the developer.

Upon detection of the marker character, the code completion component 210 receives a query 212 containing the abstract syntax tree and semantic model representing a code fragment of the source code program in the source code editor 202. In one aspect, the code fragment is the current method being developed in the source code editor 202. The code completion component 210 uses the AST trimmer 214 to generate a corresponding simplified tree 216. The simplified tree 216 is used as the query 220 for the pattern search component 218 to search the serialized pattern tree storage 224 for matching pattern trees 222.

The matched pattern trees 222 are then converted into code snippets by the pattern-to-code transformer 226 using the content of the query 212 to customize variables and arguments with local variables from the query 220. The code snippet candidates 208 are then returned back to the user interface 204 of the source code editor 202 which provides the code snippets to the developer.

Figure 3:
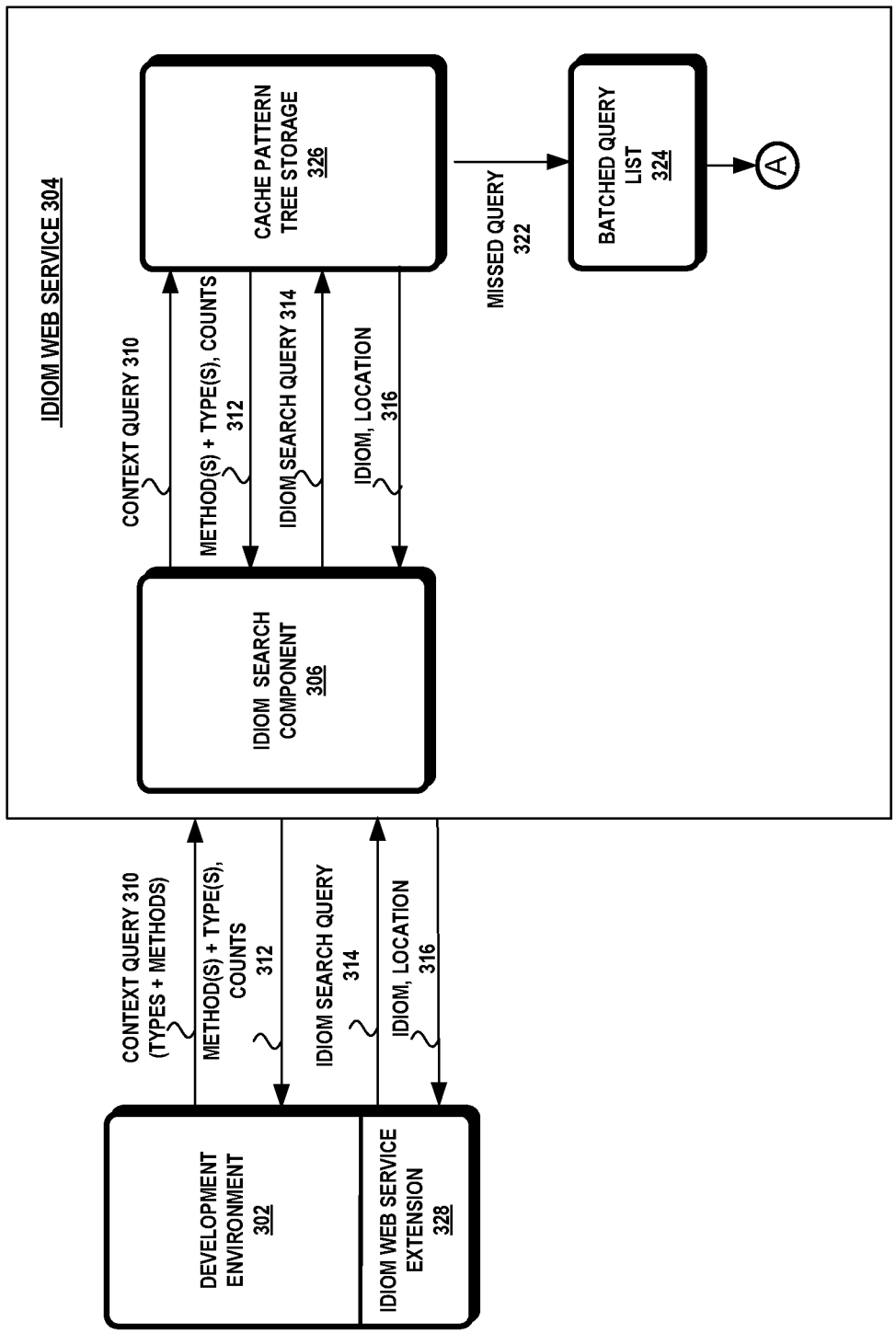
FIG. 3 is an exemplary idiom web service that provides source code idioms.

FIG. 3 illustrates an exemplary idiom web service that utilizes the pattern trees. A code idiom or idiom is a frequently occurring source code pattern. The idiom web service 304 provides a service that returns code snippets associated with the types and methods specified in the query. In one or more aspects, a software development tool, such as an development environment (e.g., source code editor, IDE) 302, may interact, through a network, with the idiom web service 304 to obtain code snippets that contain the types and methods contained in a current context of the source code being developed in the development environment 302. The development environment 302 may include an idiom web service extension 328 that facilitates communication with the idiom web service 304.

It should be noted that the disclosure is not limited to the use of a development environment interacting with the idiom web service and that any application and/or device may request code snippets for any set or combination of types and methods.

Furthermore, the term "method" is to include Application Programing Interface (API), function, and procedure. A type is a data attribute that indicates the intended use of the data. The term "type" is based on the type system of a programming language. For example, in a strongly-typed programming language, such as C#, the type system includes value types and reference types. A value type has its own copy of the data and a reference type stores a reference to the data. Value types in C# include simple type, enum types, struct types, and nullable value types. Reference types in C# include class types, interface types, array types and delegate types. A class type defines a data structure that contains data members, such as fields, and function members, such as methods and properties. In one aspect of the disclosure, a "type" pertains to a class type or object-oriented classes. "Type usage" refers to the manner in which a class is utilized, such as creating objects of a class, calling methods from a class, and interacting with other classes. However, it should be noted that the disclosure is not limited to just class-based types and may be applied to any other code constructs or combinations thereof.

The goal of the idiom web service 304 is to find patterns of code that occur commonly across other methods that have a similar context to the code being edited. For example, if a developer is writing a method that receives a string of text and a FileStream as parameters, the idiom web service 304 will return common code patterns that write text to a file.

Initially, a context query 310 is sent to the idiom web service 304 to find out which types and methods of interest occur frequently together. The context query 310 contains the types and methods of interest (i.e., context) and the idiom web service 304 returns a count of the number of times the requested types and methods occur frequently together.

The idiom web service 304 includes an idiom search component 306, a cache pattern tree storage 326, and a batched query list 324. The idiom web service 304 receives the request for the count of the number of times the requested types and methods occur together 310 and returns back the counts of how often the types and methods are found in a pattern tree using the cache pattern tree storage 326. The cache pattern tree storage 326 has the same data format as described in pattern tree storage 132 in FIG. 1.

The most frequently occurring sets of types and methods form the basis for the idiom search query 314. The idiom search query 314 contains a set of types and methods selected by the development environment 302 for the idiom web service 304 to produce the associated patterns. The idiom search component 306 searches the cache pattern tree storage 326 for patterns or idioms 316 matching the types and methods of the query 314. If none are found, then the idiom search component 306 returns a response indicating that none are found and query 322 is stored in the batched query list 324. The batched query list 324 contains the missed queries 322 that were not found. At periodic intervals, the batched queries and any other queries are mined to generate pattern trees and related data that are added to the idiom web service's cache pattern tree storage 326. Otherwise, the idiom search component 306 returns each idiom or pattern and its respective location or source 316.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
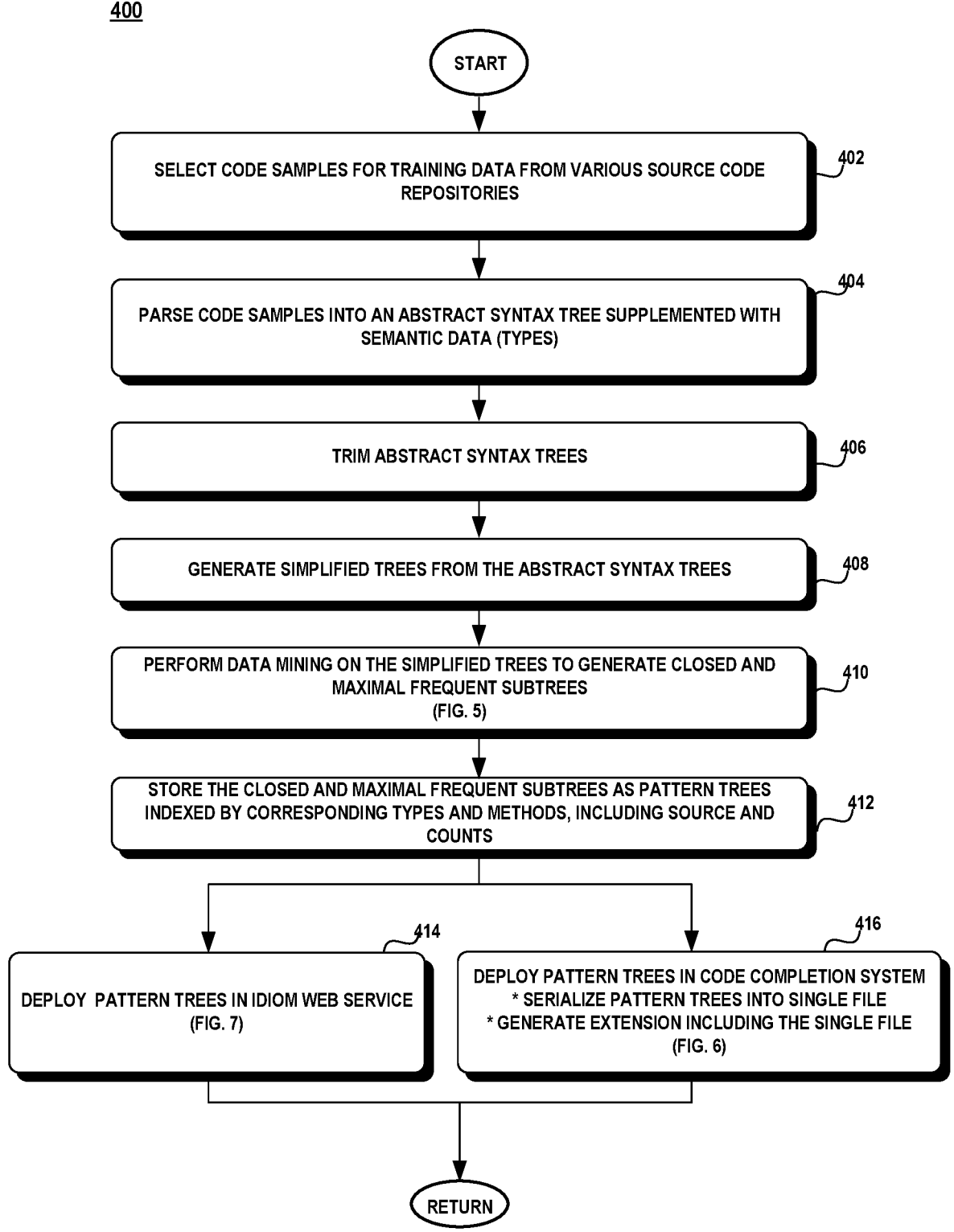
FIG. 4 is a flow diagram illustrating an exemplary method for generating and deploying pattern trees.

FIG. 4 illustrates an exemplary method for generating closed and maximal frequent subtrees. Referring to FIGS. 1 and 4, source code programs are selected from one or more source code repositories 110 as the code samples (block 402). Each method of each program is parsed by the static code analyzer 112 into a respective abstract syntax tree and semantic model 114. The abstract syntax tree is augmented with its semantic model (e.g., type information, method/API names) (block 404). Each abstract syntax tree is trimmed (block 406) to generate a corresponding simplified tree (block 408).

The simplified trees are mined to generate closed and maximal frequent subtrees (block 410) which are then stored as pattern trees in a respective pattern tree storage (block 412). In one aspect, a user may designate the type of mined subtree, such as closed, maximal frequent, or closed and maximal frequent subtrees. The pattern tree storage 132 includes a count for each pattern tree that represents how often the pattern is found overall in the pattern trees in the pattern tree storage 132 (block 412). In addition, the pattern tree storage 132 includes a type index and method indices for each pattern tree along with the source of the program from which the pattern tree was derived (block 412). The pattern trees may then be deployed to an idiom web service (block 414) and/or into a code completion system (block 416).

For the code completion system, the pattern trees need to be accessed quickly. For this reason, the pattern trees are serialized into a single file, such as a JavaScript Object Notation (JSON) file, and accessed as attribute-value pairs. The JSON file will also contain a source code string representing the locations of the corresponding source code, the methods/APIs used in the pattern, and the namespaces used in the pattern for each pattern tree Hence, the JSON file will contain many patterns and their respective information. Each pattern has a pattern tree, several URL locations since a pattern may be found in different URL locations, namespaces used in the pattern, and the methods/APIs used in the pattern. (Collectively, block 416).

Attention now turns to an exemplary method 500 of mining the simplified trees for closed and maximal frequent subtrees. The problem of subtree mining is to find the frequently occurring subtrees that satisfy the conditions of frequency, maximal, and closure. A subtree is frequent if its support adheres to the user-specified threshold. A frequent subtree is closed if none of its super trees have the same support. A frequent subtree is maximal if none of its super trees is frequent. A super tree is a larger tree that contains a frequent subtree.

Figure 5:
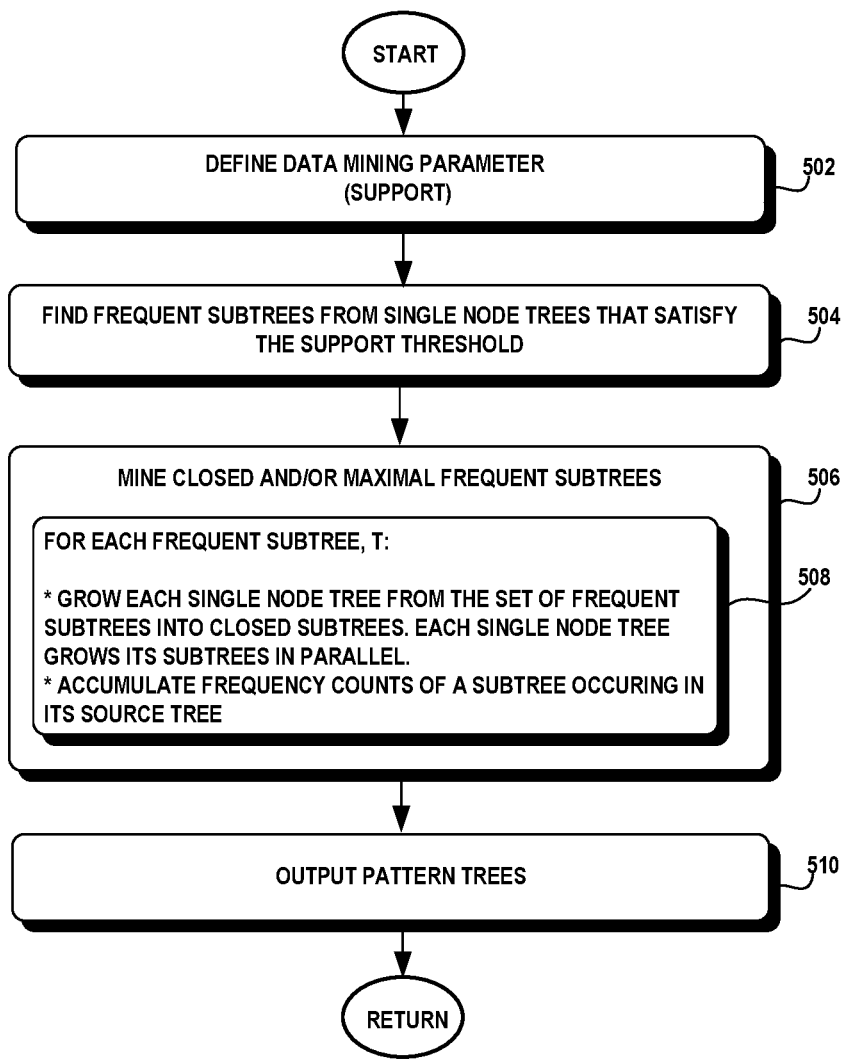
FIG. 5 is a flow diagram illustrating an exemplary method for mining closed and frequent subtrees.

Turning to FIGS. 1 and 5, the frequent subtree mining component 128 obtains the data mining parameters, such as the user-specified support threshold (block 502). The frequent subtree mining component 128 then determines the frequent subtrees by finding the single-node trees of the simplified trees that satisfy the support threshold (block 504). A single-node tree is a root or interior node of a simplified tree.

From the set of frequent subtrees, the frequent subtree mining component 128 expands those frequent subtrees until the closure condition and/or maximal condition is satisfied (block 506). For each frequent subtree (block 508), the frequent subtree is expanded or grown into a number of possible subtrees (block 508). Each of the possible subtrees is grown independently and in parallel with all the other subtrees by adding one node at a time until the subtree satisfies the closure and/or maximal condition (block 508). The frequency counts of a subtree occurring in a source tree are accumulated (block 508). The frequent subtrees having satisfied the closure and/or maximal condition are then output as the pattern trees (block 510).

Figure 6:
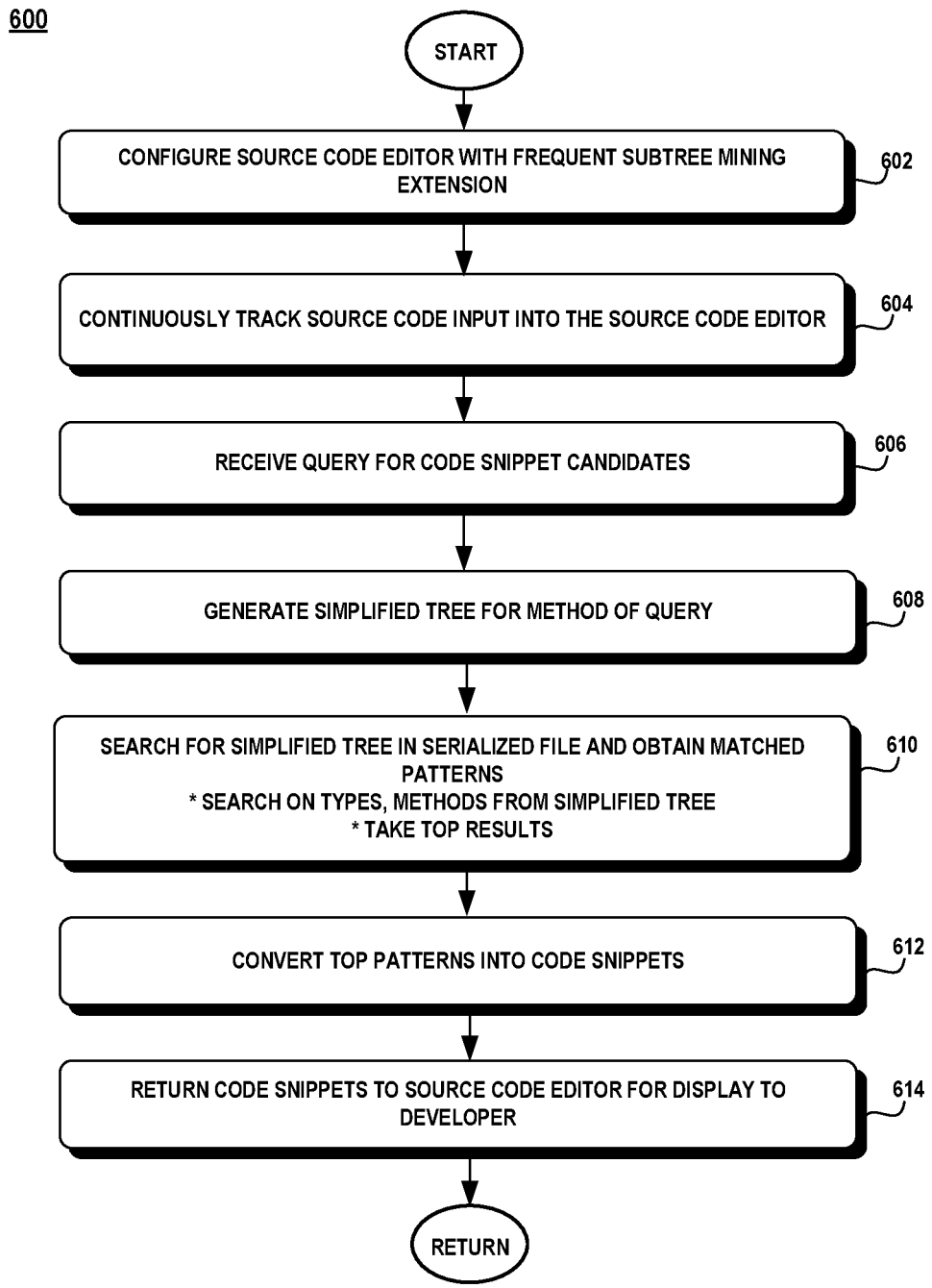
FIG. 6 is a flow diagram illustrating an exemplary method of code completion using pattern trees.

Attention now turns to an exemplary method 600 of a code completion system utilizing the closed and maximal frequent subtrees. Referring to FIGS. 2 and 6, initially, the source code editor 202 is configured with a code completion system that uses closed and maximal frequent subtrees (block 602). In one aspect, the code completion system 210 may be configured as an extension to the source code editor 202 as an auxiliary executable file having additional capabilities. The extension may be implemented as an add-on or plugin, such as a Dynamic Link Library (DLL).

The source code editor 202 continuously tracks the source code that is input and displayed in the user interface 204. The parser 206 formats the source code into an augmented abstract syntax tree having type information. In one aspect, the source code editor 202 tracks the source code of a method that is currently under development. (Collectively, block 604).

Upon detection of a marker character, the augmented abstract syntax tree is sent to the code completion system 210 for code snippet candidates 208 (block 606). The AST trimmer 214 generates a simplified tree 216 from the abstract syntax tree contained in the query 212 (block 608). The pattern search component 218 searches for similar trees in the serialized pattern tree storage 224 (block 610). Those trees having the same types and method invocations as the simplified tree are accessed through the type and method indices in the serialized pattern tree storage (block 610). A threshold amount of pattern trees is considered based on the top closest matches (block 610).

For the closest matching pattern trees, the top few branches of those pattern trees are matched with the last few branches of the code query's simplified tree. The pattern contained in the remaining portion of the pattern tree is converted into a code snippet (block 612) The pattern-to-code transformer 226 transforms each of the matched pattern trees 222 into a code snippet using the local data contained in the query 212 (block 612). The code snippet candidates 210 are then returned to the source code editor 202 (block 614).

Figure 7:
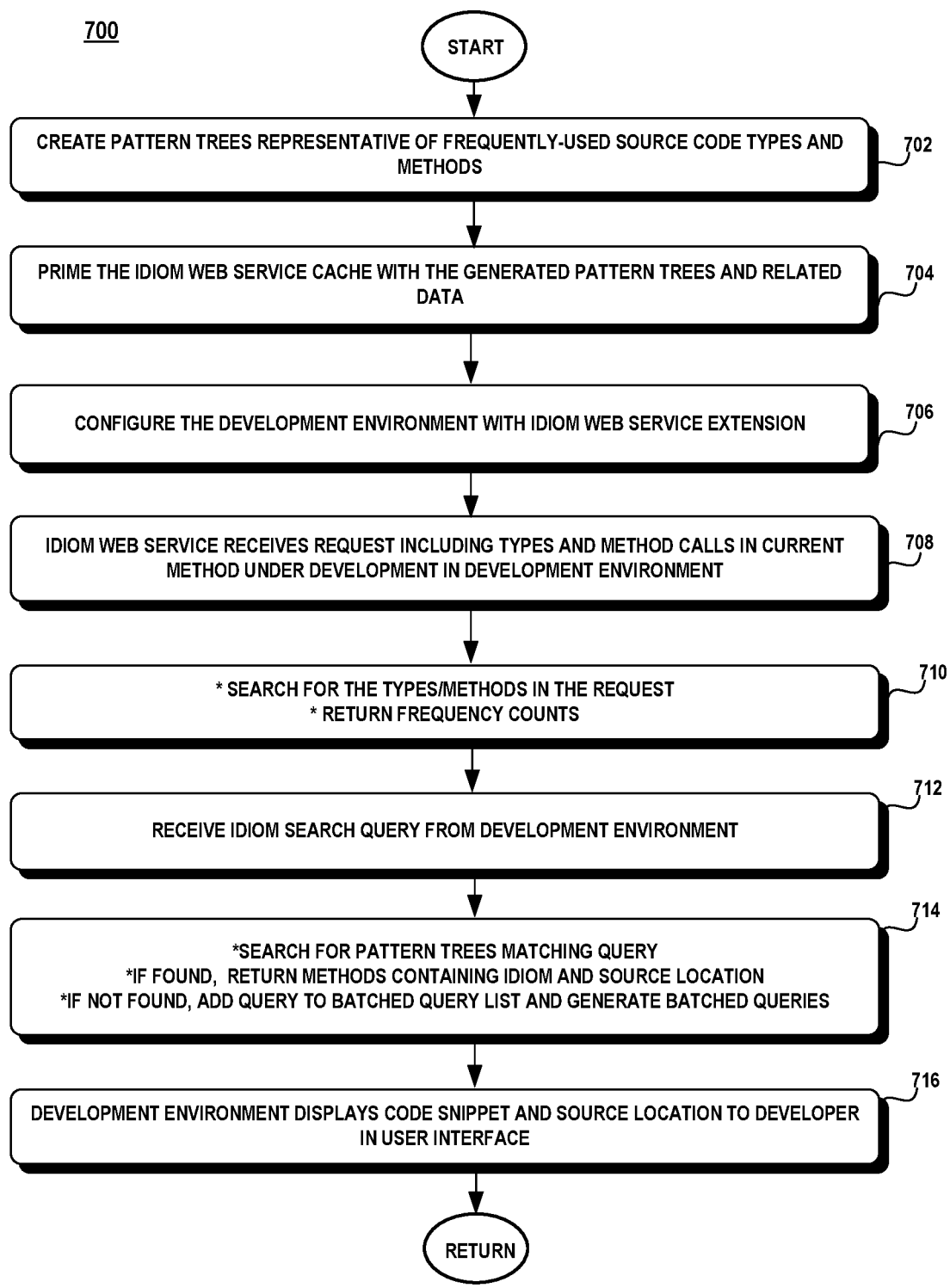
FIG. 7 is a flow diagram illustrating an exemplary method of an idiom web service.

Attention now turns to an exemplary method 700 of an idiom web service utilizing the pattern trees. Turning to FIGS. 3 and 7, the idiom web service 304 is configured with the pattern trees that represent the most frequently-used types and methods. The cache pattern tree storage 326 is loaded with this data so that the idiom web service 304 is able to respond quickly to the queries it receives. An offline process is used to generate pattern trees and the associated data (types, methods, counts) for the most likely contexts that the developers will encounter (block 702). This is done by looking at the contexts that occur most frequently in the source code programs that have already been mined.

For example, the top 5,000 frequently-used types across the mined source code programs are each made into a query. Each query contains a context of just one type. Then the top 5,000 frequently-called methods are used to create 5,000 more queries in the same way. Next the top 5,000 frequent pairs of co-occurring types are used to create queries. For example, if FileStream and TextWriter are the two types that are used together the most across all methods in the set of source code programs, then a query that includes these two types is created to be processed. Then the second most frequently co-occurring pair of types is determined and a query is created. This is done also for the top 5,000 frequent pairs of method calls. Finally, queries for the 5,000 most frequent triples of types that co-occur are created and the 5,000 most frequent triples of method calls.

Once the queries are generated, each query is used to extract matching simplified trees from the simplified tree repository 120 which are input into the frequent subtree mining phase 104. The frequent subtree mining phase 104 will generate the pattern trees and the associated types, methods, and counts that will be used to prime the cache pattern tree storage 326 (block 704). The development environment 302 that interacts with the idiom web service is configured with an extension 328 that facilitates the communications between the development environment 302 and the idiom web service 304 (block 706).

The idiom web service 304 receives a request from the development environment 302 seeking a count of how often the methods and types contained in a query occur in another method (block 708). The idiom web service 304 searches the cache pattern tree storage 326 for this information and returns the counts (block 710).

The idiom web service 304 may receive a second query 314 requesting methods that use a specific set of types and methods (block 712). The idiom search component 306 searches the cache pattern tree storage 326 and if found, returns the set of methods that contain the corresponding pattern tree as well as the source location for each method (block 714). If the idiom search component 306 fails to find the requested types and methods, the query is placed in the batched query list 324 (block 714). At periodic intervals, the queries in the batched query list 324 are mined to generate pattern trees that are added to the cache pattern tree storage 326 (block 714).

Figure 8A:
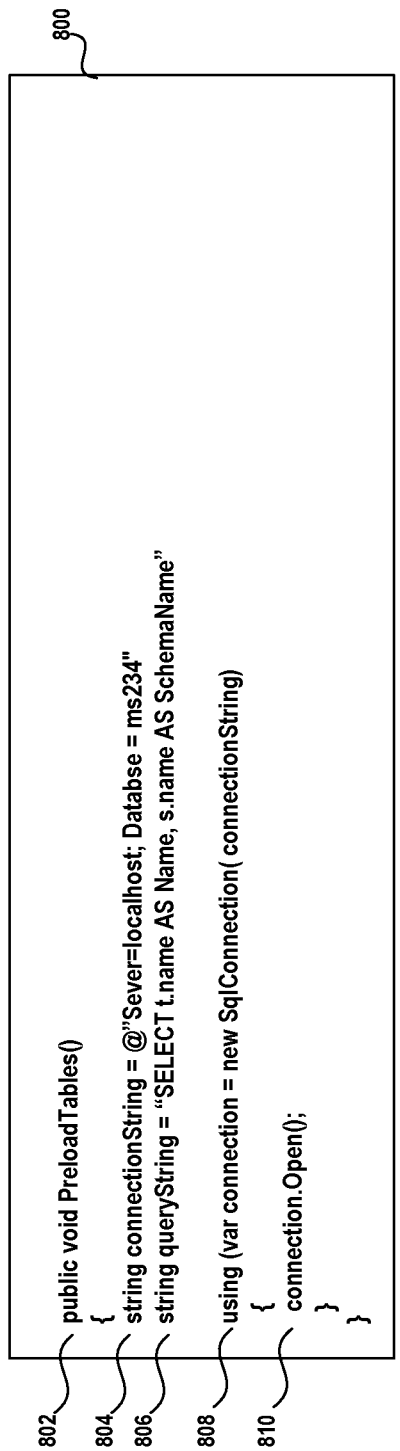
FIG. 8A is exemplary source code and FIG. 8B is an illustration of an exemplary simplified tree for the source code of FIG. 8A.

Attention now turns to FIGS. 8A, 8B, 9A and 9B which illustrate aspects of the frequent source code pattern mining. FIG. 8A illustrates an exemplary source code fragment of a PreloadTables method 800 written in the C# programming language. The code fragment 800 includes the method declaration statement 802 which identifies the method name as PreloadTables. There are two string variables, connectionString and queryString, that are declared in statements 804, 806. The using statement 808 includes an instantiation of a connection object that is assigned the result of the method invocation SqlConnection. The SqlConnection method is invoked with the parameter connectionString. The using statement 808 invokes the method connection.Open( ) 810.

Figure 8B:
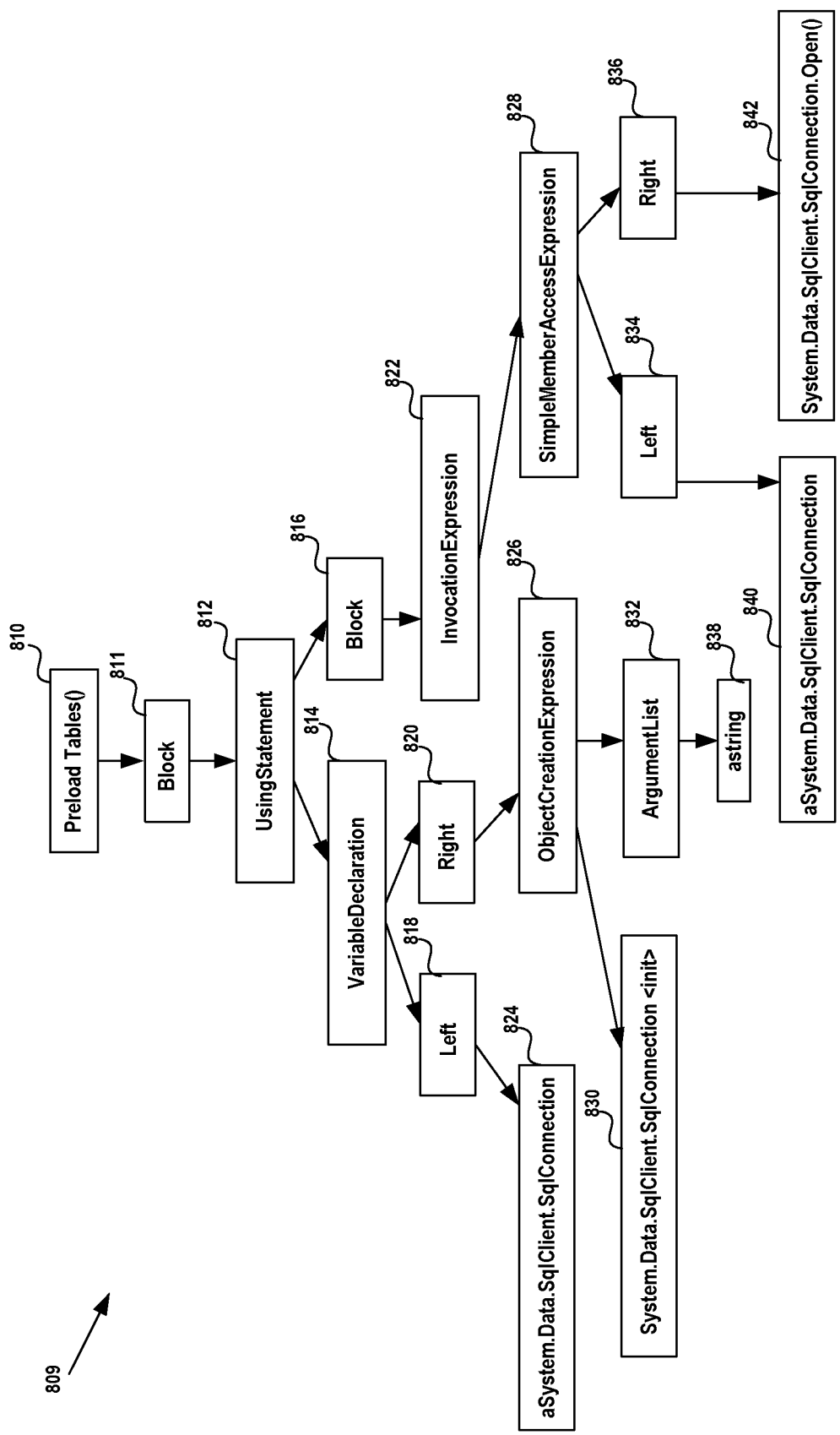

FIG. 8B illustrates an exemplary simplified tree 809 for the PreloadTables method. The simplified tree 809 contains a root node 810, several interior nodes 811-822, 826-836 and leaf nodes 824, 830, 838-842. Each node in the simplified tree 810 contains a label that identifies a code construct found in the source code. The simplified tree 810 contains type information describing the classes associated with various code constructs. For example, node 838 represents that the type of the argument used in the object instantiation is a string. In addition, the simplified tree represents the syntactic structure of the PreloadTables method.

Figure 9A:
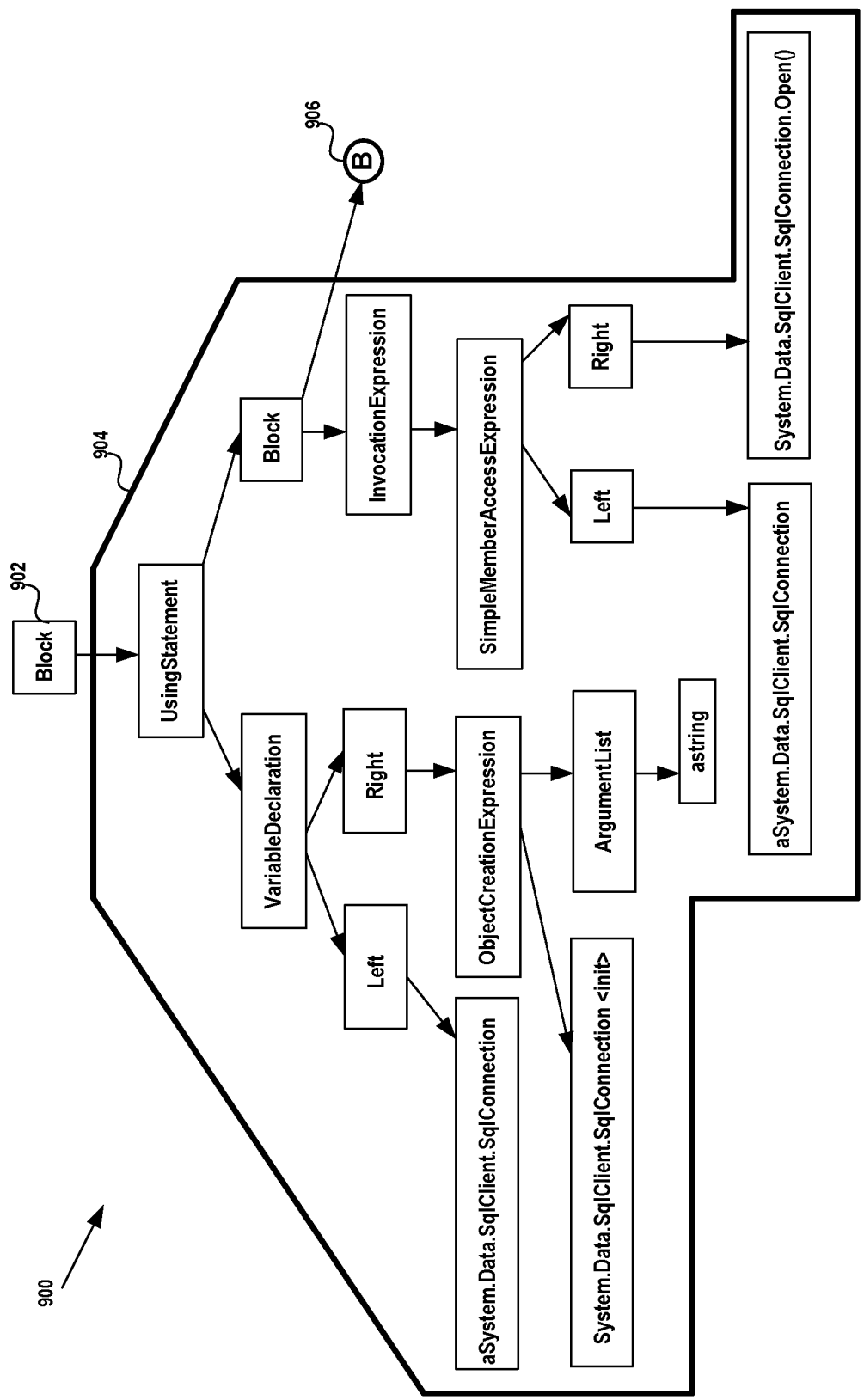
FIGS. 9A-9B are illustrations of the process of matching a simplified tree to a closed and maximal frequent subtree for the source code shown in FIG. 8A.
Figure 9B:
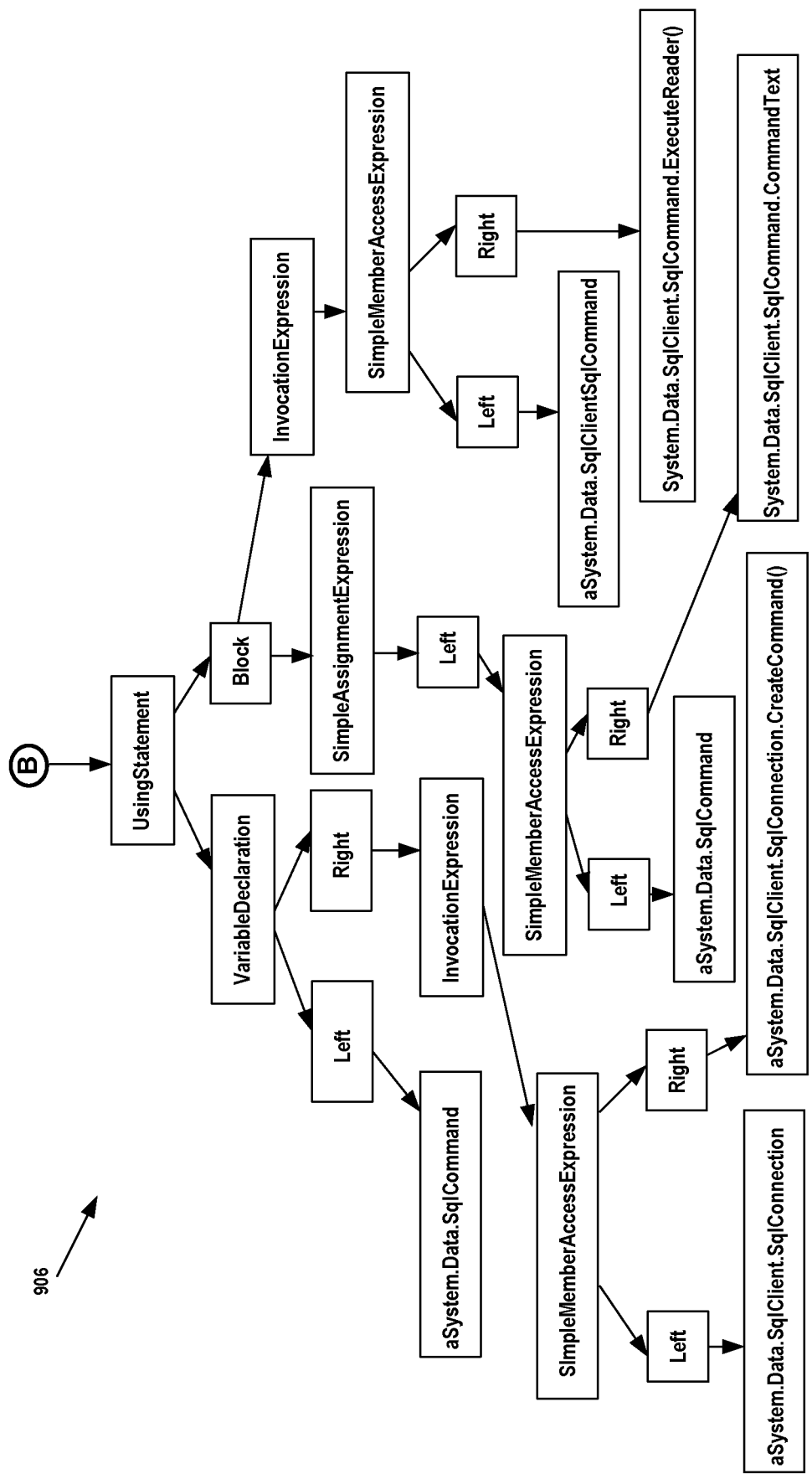

FIGS. 9A-9B illustrates an exemplary pattern tree 900. The pattern tree 900 contains a root node 902, a first subtree 904 shown in FIG. 9A and a second subtree shown in FIG. 9B.

Figure 10:
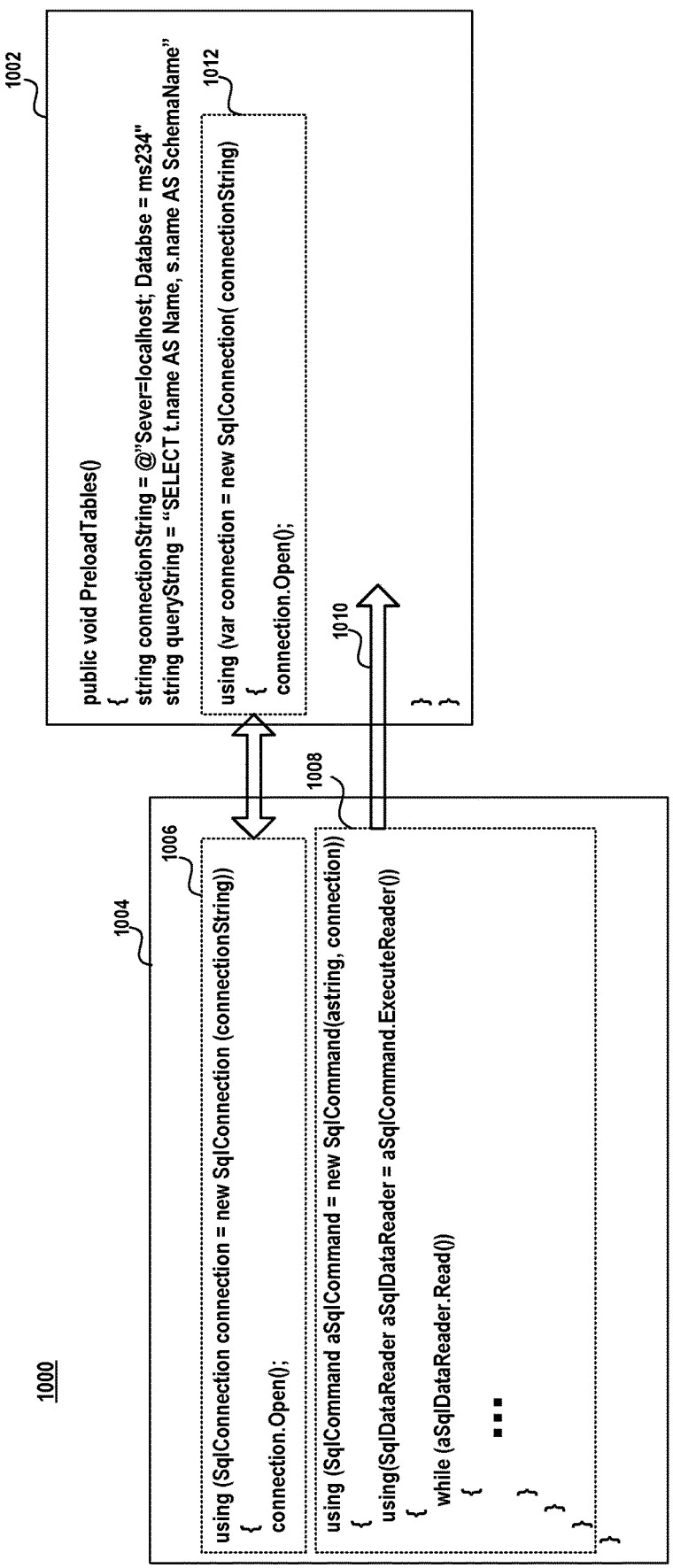
FIG. 10 is an illustration of an exemplary code snippet candidate being applied in a code completion system.

FIG. 10 illustrates the use of the pattern tree for code completion. An exemplary display 1000 is shown having a user interface 1002 in which a user's source code is being developed. The source code under development is the PreloadTables method. The code completion system transforms the PreloadTables method shown in user interface 1002 into the simplified tree 809 shown in FIG. 8B. The pattern tree, shown in FIGS. 9A-9B, is found as a matched pattern with the simplified tree. The pattern tree is matched with the simplified tree 809 and finds that subtree 904 is a subtree of the user's simplified tree 809. This match indicates that code fragment 1006 in code fragment 1004 already exists in a portion 1012 of the user's PreloadTables( ) method. The subtree 906 shown in FIG. 9B is then displayed as a code snippet candidate 1008 to be inserted at location 1010.

Exemplary Operating Environment

Figure 11:
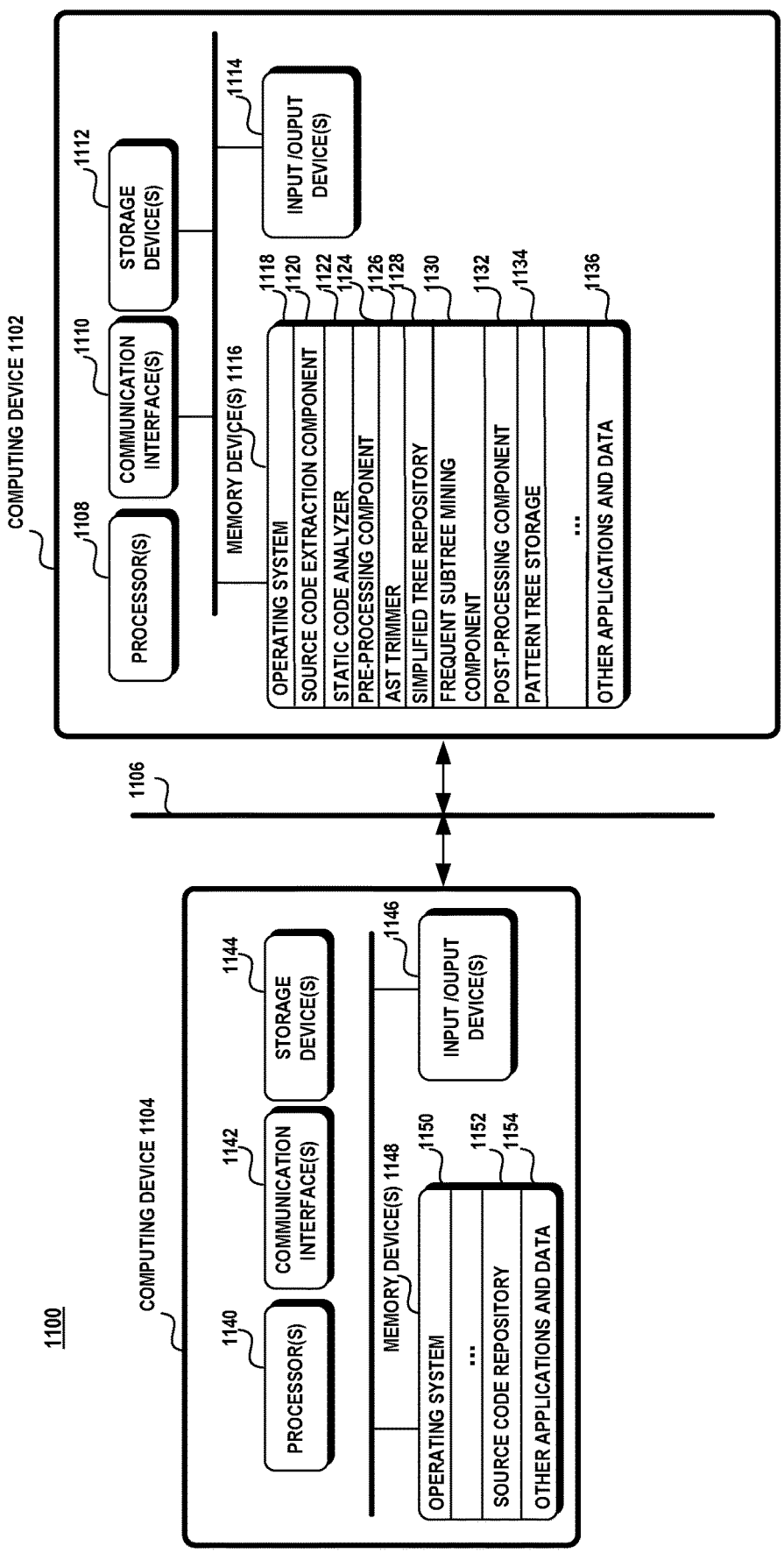
FIG. 11 is a block diagram illustrating an exemplary operating environment of a frequent source code pattern mining system.
Figure 12:
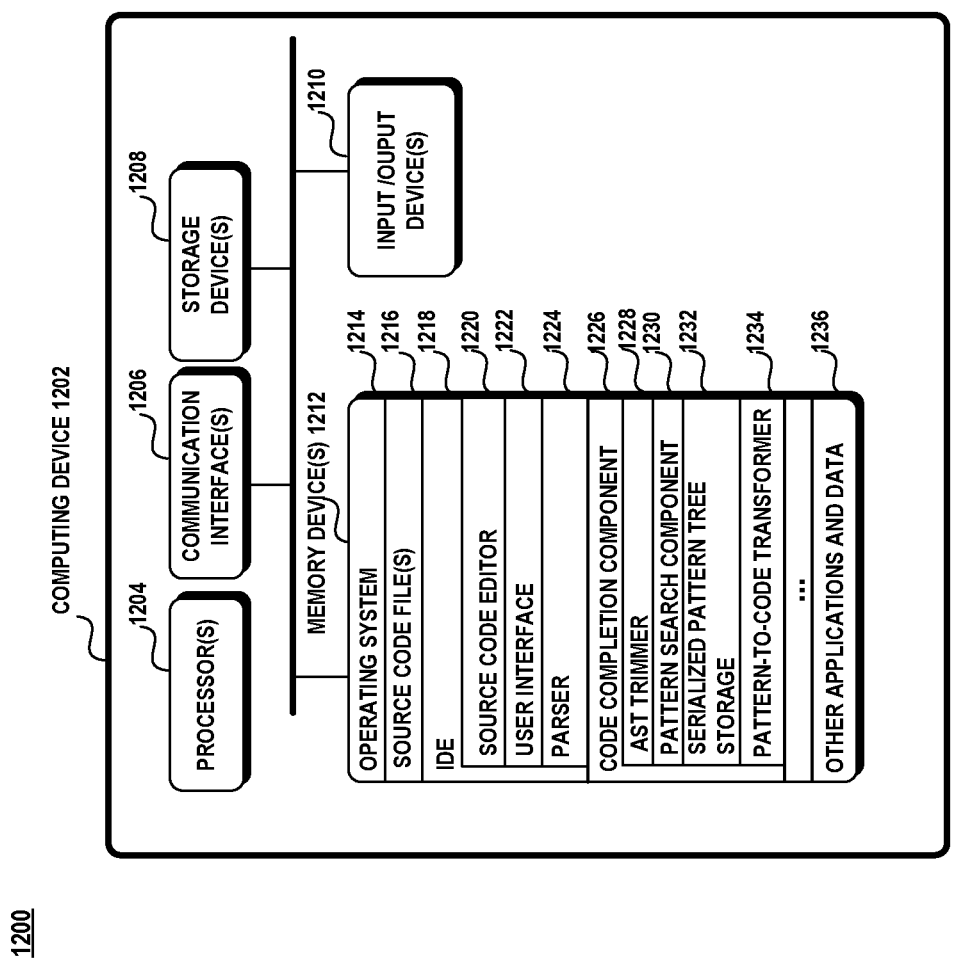
FIG. 12 is a block diagram illustrating an exemplary operating environment of a code completion system using the pattern trees.
Figure 13:
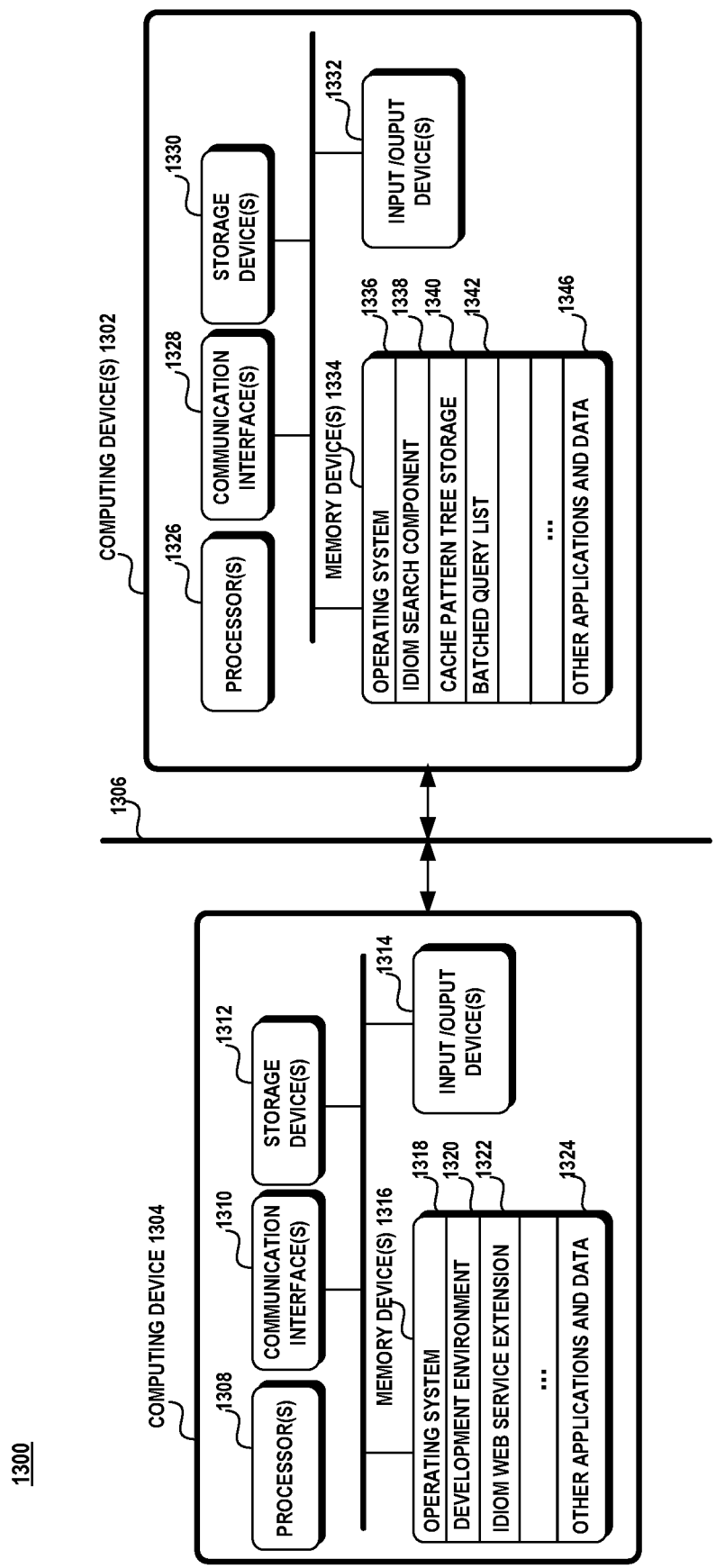
FIG. 13 is a block diagram illustrating an exemplary operating environment of an idiom web service.

Attention now turns to a discussion of the exemplary operating environments. FIG. 11 illustrates an exemplary operating environment of a frequent pattern mining system that generates pattern trees. FIG. 12 illustrates an exemplary operating environment of a code completion system that utilizes the pattern trees. FIG. 13 illustrates an exemplary operating environment of an idiom web service that provides pattern trees in an on-demand service. It should be noted that the exemplary operating environments are not limited to those shown in FIGS. 11-13 and other configurations are possible, including combinations of the components shown in FIGS. 11-13.

Turning to FIG. 11, an exemplary frequent pattern mining system 1100 includes a computing device 1102 that performs the frequent pattern mining coupled to a computing device 1104 that supports a source code repository. The computing devices 1102, 1104 communicate through network 1106. However, it should be noted that the aspects disclosed herein is not constrained to any particular configuration of devices and that other configurations are possible.

A computing device 1102, 1104 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 1100 may be configured in a network environment, a distributed environment, a multi-processor environment, or a stand-alone computing device having access to remote or local storage devices.

A computing device 1102, 1104 may include one or more processors 1108, 1140, one or more communication interfaces 1110, 1142, one or more storage devices 1112, 1144, one or more input/output devices 1114, 1146 and one or more memory devices 1116, 1148. A processor 1108, 1140 may be any commercially available or customized processor and may include dual microprocessors and multi-processor architectures. A communication interface 1110, 1142 facilitates wired or wireless communications between the computing devices and other devices.

A storage device 1112, 1144 may be computer-readable medium that does not contain propagating signals, such as modulated data signals transmitted through a carrier wave. Examples of a storage device may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 1114, 1146, may include a keyboard, mouse, pen, voice input device, touch input device, display, speakers, printers, etc., and any combination thereof.

A memory device 1116, 1148 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device may also include one or more external storage devices or remotely located storage devices that do not pertain to propagated signals, such as modulated data signals transmitted through a carrier wave.

Memory device 1116 may include an operating system 1118, a source code extraction component 1120, a static code analyzer 1122, a pre-processing component 1124, an AST trimmer 1126, a simplified tree repository 1128, a frequent subtree mining component 1130, a post-processing component 1132, pattern tree storage 1134, and other applications and data 1136. Memory device 1148 may include an operating system 1150, a source code repository 1152 and other applications and data 1154.

Network 1106 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

Network 1106 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

FIG. 12 represents an exemplary operating environment of a code completion system 1200. The code completion system 1200 includes a computing device 1202 having one or more processors 1204, one or more communication interfaces 1206, one or more storage devices 1208, input/output devices 1210, and one or more memory devices 1212, as described above. The memory device 1212 may include an operating system 1214, one or more source code files 1216, an IDE 1218 having a source code editor 1220, a user interface 1222, and a parser 1224. The memory device 1212 may also include a code completion component 1226 having an AST trimmer 1228, a pattern search component 1230, a serialized pattern tree storage 1232, a pattern-to-code transformer 1234 in addition to other applications and data 1236.

FIG. 13 represents an exemplary operating environment of an idiom web service 1300. The idiom web service includes one or more computing devices 1302 coupled to a computing device 1304 of a developer through a network 1306. Computing devices 1302, 1304 have one or more processors 1308, 1326, one or more communication interfaces 1310, 1328, one or more storage devices 1312, 1330, input/output devices 1314, 1332, and one or more memory devices 1316, 1334, as described above. Memory device 1334 includes an operating system 1336, an idiom search component 1338, a cache pattern tree storage 1340, a batched query list 1342, and other applications and data 1346. Memory device 1316 includes an operating system 1318, a development environment 1320, an idiom web service extension 1322, and other applications and data 1324.

Technical Effect

Aspects of the subject matter disclosed herein pertain to the technical problem of identifying large frequently-occurring source code patterns or idioms from methods/APIs that can be used in various phases of code development. The technical features associated with addressing this problem involves mining a large corpus of source code programs for closed and maximal frequent subtrees that represent the largest and frequently-used source code patterns from methods which can then be used in other methods using similar types and methods. The closed and maximal frequent subtrees consider the syntactic structure of the methods mined in addition to the type information associated with these methods and method invocation usage. These subtrees represent source code patterns that are readily available from within the code development system thereby making the development process faster and more efficient. In addition, the source code patterns are provided from an on-demand web service thereby available to a wider range of applications other than code development tools.

Conclusion

A system is disclosed having one or more processors coupled to a memory. The memory has one or more programs that are configured to be executed by the one or more processors. The programs include instructions that: obtain a plurality of trees, a tree representing a syntactic structure of a method of a source code program and including type data of the method; perform a closed and maximal frequent subtree data mining analysis on the plurality of trees to produce one or more idioms, an idiom representing a frequently-occurring source code pattern within the plurality of trees; and utilize the idioms to facilitate source code development.

In addition, the one or more programs include instructions that: generate a plurality of pattern trees from the closed and maximal frequent subtree data mining analysis. A pattern tree represents at least one idiom and the pattern tree is indexed by a type and at least one method. The one or more programs include further instructions that: utilize the plurality of pattern trees to generate code snippet candidates to complete a code fragment. In one or more aspects, the one or more programs include instructions that: utilize the plurality of pattern trees to provide an idiom associated with a requested type and method.

Additionally, the one or more programs include instructions that: associate a count with each of the plurality of pattern trees, the count indicating a number of types and methods associated with each pattern tree; and provide the count for a requested type and method. A pattern tree includes a source from which a respective idiom was derived. The pattern trees are generated from methods of source code programs from one or more source code repositories. In one or more aspects, the type data includes classes of objects used in methods.

A method is disclosed comprising: receiving, on a computing device having a processor coupled to a memory, source code of a first method; transforming the first method into a tree, the tree representing the syntactic structure of the source code of the first method and including type data of the first method; matching the tree with a pattern tree, a pattern tree representing a closed and/or maximal frequent subtree mined from methods of existing source code programs;

generating a code snippet from the matched pattern tree; and displaying the code snippet as a candidate to complete the first method.

In one aspect, matching the tree with the pattern tree further comprises: finding the pattern tree based on a type and method associated with the tree matching a type and method associated with the pattern tree. Additionally, the method further comprises: matching a first subtree of the pattern tree with the tree; obtaining a second subtree of the pattern tree, wherein the second subtree does not match the tree; and transforming the second subtree into the code snippet.

The generation of a tree further comprises parsing the source code of the method into an abstract syntax tree; and adding type data of the method into the abstract syntax tree. In one or more aspects, the method further comprises displaying a location with the code snippet, the location representing a source from which the code snippet originated. Additionally, when no matching pattern tree is found, the first method is mined to obtain a corresponding pattern tree. The type data includes classes of objects used in the first method.

A device is disclosed comprising a processor and a memory. The processor is configured to: obtain a plurality of idioms generated through application of a data mining technique on methods of a plurality of source code programs, an idiom representing a frequently-occurring source code pattern associated with a type and one or more methods; receive a first request for an idiom from the plurality of idioms, the request including a type and method associated with a second method; find an idiom that matches the type and method of the second method from the plurality of idioms; and transmit a response including the found idiom.

In one or more aspects, the processor is further configured to associate a count with each idiom of the plurality of idioms, the count representing a frequency of a combination of the type and methods of an idiom appearing in other idioms. Additionally, the processor is further configured to receive a request for a count of idioms associated with a first type and a first method; search the plurality of idioms for a requested idiom associated with the first type and the first method; and return a count of the idioms matching the requested idioms. The data mining technique generates closed and maximal frequent subtrees and a type is a class of an object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
a processor and a memory;
the memory includes a pattern tree storage and an idiom search component;
wherein the pattern tree storage includes a plurality of pattern trees, each pattern tree representing a closed and maximal frequent subtree associated with a syntactic structure, type, and a source code method, each pattern tree indexed by a type and a method name, and
wherein the idiom search component includes instructions that when executed by the processor perform actions that:
receives a request, through a network, for a pattern tree having a first type and a first method name;
searches the pattern tree storage for a pattern tree having a type index matching the first type and a method index matching the first method name of the request; and
upon finding a pattern tree matching the first type and the first method name, returns the pattern tree.

2. The system of claim 1, wherein the idiom search component includes further instructions that when executed by the processor perform actions that:
upon the search not finding the pattern tree having the first type and the first method name, mines a source code repository for closed and maximal frequent subtrees for the first type and the first method name.

3. The system of claim 2, wherein an offline process is used to mine the source code repository for the closed and maximal frequent subtrees of the first type and first method name.

4. The system of claim 2, wherein the idiom search component includes further instructions that when executed by the processor perform actions that:
generates simplified trees for methods of source code programs of the source code repository having the first method name and/or the first type;
analyzes the simplified trees to detect closed and maximal frequent subtrees; and
transforms each of the closed and maximal frequent subtrees as a pattern tree indexed by the first method name and the first type.

5. The system of claim 1, wherein each pattern tree in the pattern tree storage includes a count representing frequency of a pattern associated with a respective pattern tree.

6. The system of claim 5, wherein the idiom search component includes further instructions that when executed by the processor perform actions that:
receives a request for a count of pattern trees of a second type and second method name;
searches the pattern tree storage for the second type and the second method name; and
upon finding a match, returns the count associated with the second type and the second method name.

7. The system of claim 1, wherein the request for the pattern tree is received from an integrated development environment, source code editor or software development environment.

8. A computer-implemented method, comprising:
storing a plurality of pattern trees, a pattern tree representing a frequently-occurring pattern of source code derived from a closed and maximal subtree, wherein the frequently-occurring pattern of source code is associated with a syntactic structure, type, and method, wherein each pattern tree is indexed by a type index and one or more method name indices;
receiving a request, through a network, for a pattern tree associated with a first type and a first method name;
searching the plurality of pattern trees for a pattern tree having a type index matching the first type and a method name index matching the first method name; and
upon the search finding the pattern tree matching the first type and the first method name, returning the pattern tree.

9. The computer-implemented method of claim 8, further comprising:
upon the search not finding the pattern tree matching the first type and the first method name, mining a source code repository for closed and maximal frequent subtrees having the first type and/or the first method name.

10. The computer-implemented method of claim 9, further comprising:
- extracting source code samples from a source code repository;
- parsing each source code sample into an abstract syntax tree;
- supplementing each abstract syntax tree with type data; and
- generating a simplified tree from each abstract syntax tree.

11. The computer-implemented method of claim 9, further comprising:
- obtaining a predefined support threshold;
- searching for one or more frequent subtrees that satisfy the support threshold;
- expanding the one or more frequent subtrees until a closure condition and/or a maximal condition is satisfied; and
- outputting frequent subtrees that satisfy the closure and/or maximal condition as pattern trees.

12. The computer-implemented method of claim 8, further comprising:
- associating a location with each pattern tree of the plurality of pattern trees, the location representing a source code program from which the pattern tree originated; and
- upon the search finding the pattern tree matching the first type and the first method name, returning the location of the found pattern tree.

13. The computer-implemented method of claim 8, wherein each pattern tree fo the plurality of pattern trees includes a count representing frequency of a pattern associated with a respective pattern tree.

14. The computer-implemented method of claim 13, further comprising:
- receiving a request for a count of pattern trees of the first type and the first method name;
- searching the plurality of pattern trees for the first type and the first method name; and
- upon finding a match, returning the count associated with the first type and the first method name.

15. The computer-implemented method of claim 14, wherein the request for the count of pattern trees of the first type and the first method name is received before the request for the pattern tree associated with a first type and a first method name.

16. A non-transitory computer-readable storage medium having instructions that when executed on a processor performs operations, comprising:
- accessing a plurality of pattern trees, each pattern tree representing a frequently-occurring source code pattern derived from a closed and maximal frequent subtree, each pattern tree associated with a syntactic structure and type of a source code method, each pattern tree accessed by a type index and at least one method name index, each pattern tree having a count representing a frequency of the pattern tree, each pattern tree having a location of a source code program from which the pattern tree originated;
- receiving a request for pattern trees associated with a first type and a first method name;
- searching the plurality of pattern trees for pattern trees associated with the first type and the first method name; and
- upon the search finding at least one pattern tree matching the first type and the first type name, returning the at least one pattern tree and a location associated with the at least one pattern tree.

17. The non-transitory computer-readable storage medium of claim 16 having instructions that when executed on a processor performs operations, comprising:
- upon the search not finding the at least one pattern tree matching the first type and the first type name, mining a source repository for closed and maximal frequent subtrees matching the first type and/or the first type name.

18. The non-transitory computer-readable storage medium of claim 16 having instructions that when executed on a processor performs operations, comprising:
- extracting methods from a plurality of source code programs;
- parsing each method into an abstract syntax tree;
- supplementing each abstract syntax tree with type information and a method name;
- converting each abstract syntax tree into a simplified tree; and
- extracting a closed and maximal frequent subtree from the simplified tree.

19. The non-transitory computer-readable storage medium of claim 18 having instructions that when executed on a processor performs operations, comprising:
- accessing a support threshold;
- obtaining a plurality of frequent subtrees from the simplified trees that support the support threshold; and
- expanding each of the frequent subtrees until a closure condition and/or a maximal condition is satisfied.

20. The non-transitory computer-readable storage medium of claim 19 having instructions that when executed on a processor performs operations, comprising:
- storing the frequent subtrees meeting the closure condition and the maximal condition as a pattern tree.

* * * * *